(12) United States Patent
Yu et al.

(10) Patent No.: US 11,213,103 B2
(45) Date of Patent: *Jan. 4, 2022

(54) GEL NAIL STICKER AND MANUFACTURING METHOD THEREFOR

(71) Applicant: GLLUGA INC., Cheonan-si (KR)

(72) Inventors: Gi Hyun Yu, Cheonan-si (KR); Tae Gyu Yoo, Cheonan-si (KR); Jae Bak Ahn, Cheonan-si (KR)

(73) Assignee: GLLUGA INC., Cheonan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,010

(22) Filed: Jun. 21, 2019

(65) Prior Publication Data

US 2019/0328090 A1  Oct. 31, 2019

Related U.S. Application Data

(62) Division of application No. 15/579,005, filed as application No. PCT/KR2016/008784 on Aug. 10, 2016, now Pat. No. 10,376,024.

(30) Foreign Application Priority Data

Aug. 10, 2015 (KR) .......................... 10-2015-0112544

(51) Int. Cl.
*B44C 1/00* (2006.01)
*A45D 29/00* (2006.01)
(Continued)

(52) U.S. Cl.
CPC .......... *A44C 15/0005* (2013.01); *A44C 15/00* (2013.01); *A44C 15/008* (2013.01);
(Continued)

(58) Field of Classification Search
CPC ..... B44C 1/105; B44C 15/008; A44C 15/008; A45D 29/001; A45D 31/00; Y10T 156/1057; B32B 38/0004
See application file for complete search history.

(56) References Cited

U.S. PATENT DOCUMENTS 2,979,061 A * 4/1961 Greenman ............... A61Q 3/00
132/73
8,925,557 B2    1/2015 Liao
(Continued)

FOREIGN PATENT DOCUMENTS

JP      6-75305 U    10/1994
JP      8-126518 A    5/1996
(Continued)

OTHER PUBLICATIONS

International Search Report dated Nov. 1, 2016 in counterpart International Patent Application No. PCT/KR2016/008784 (2 pages in English and 2 pages in Korean).

*Primary Examiner* — Mark A Osele
*Assistant Examiner* — Christopher C Caillouet
(74) *Attorney, Agent, or Firm* — NSIP Law

(57) ABSTRACT

Provided is a gel nail sticker including: a lower laminated part which is a part directly attached to a nail or a toenail, and has a color or a pattern, and is formed of a flexible material to correspond to a curved surface of the nail or the toenail; and an upper laminated part which is a transparent coated layer positioned on the lower laminated part and providing glossiness to a color or a pattern of the lower laminated part, and is in a flexible semi-solid state to correspond to the curved surface of the nail or the toenail before being attached to the nail or the toenail, and is cured to a solid state while maintaining a form attached to the nail or the toenail when an ultraviolet ray is irradiated to the
(Continued)

upper laminated part after the upper laminated part is attached to the nail or the toenail.

18 Claims, 3 Drawing Sheets

(51) Int. Cl.

| | | |
|---|---|---|
| *A44C 15/00* | (2006.01) | |
| *B32B 38/00* | (2006.01) | |
| *A45D 31/00* | (2006.01) | |
| *B41M 5/00* | (2006.01) | |
| *B44C 1/10* | (2006.01) | |
| *B44C 1/17* | (2006.01) | |
| *B32B 7/06* | (2019.01) | |
| *B44C 3/02* | (2006.01) | |
| *B32B 27/08* | (2006.01) | |
| *B32B 27/26* | (2006.01) | |
| *B32B 37/18* | (2006.01) | |
| *B32B 7/12* | (2006.01) | |

(52) U.S. Cl.
CPC .......... *A45D 29/001* (2013.01); *A45D 31/00* (2013.01); *B32B 7/06* (2013.01); *B32B 7/12* (2013.01); *B32B 27/08* (2013.01); *B32B 27/26* (2013.01); *B32B 37/182* (2013.01); *B32B 38/0004* (2013.01); *B32B 38/145* (2013.01); *B41M 5/00* (2013.01); *B41M 5/0064* (2013.01); *B44C 1/105* (2013.01); *B44C 1/1733* (2013.01); *B44C 3/02* (2013.01); *A45D 2200/205* (2013.01); *B32B 2451/00* (2013.01); *Y10T 156/1057* (2015.01); *Y10T 428/28* (2015.01); *Y10T 428/2809* (2015.01)

(56) References Cited

U.S. PATENT DOCUMENTS

| | | | |
|---|---|---|---|
| 2005/0199253 A1 | 9/2005 | Fiore et al. | |
| 2012/0263905 A1 | 10/2012 | Park | |
| 2014/0251360 A1* | 9/2014 | Kim | A45D 29/001 |
| | | | 132/200 |
| 2014/0326266 A1* | 11/2014 | Park | B05D 3/067 |
| | | | 132/200 |
| 2015/0173483 A1 | 6/2015 | Raouf et al. | |
| 2019/0125652 A1* | 5/2019 | Sheran | A61K 8/8117 |

FOREIGN PATENT DOCUMENTS

| | | | |
|---|---|---|---|
| JP | 2002-65346 A | 3/2002 | |
| JP | 3756916 B2 | 3/2006 | |
| JP | 4324241 B1 | 9/2009 | |
| JP | 2010-167712 A | 8/2010 | |
| JP | 2012-223318 A | 11/2012 | |
| JP | 2013-541403 A | 11/2013 | |
| JP | 5507439 B2 | 5/2014 | |
| JP | 2014-171878 A | 9/2014 | |
| JP | 5645989 B2 | 12/2014 | |
| JP | 2015-36117 A | 2/2015 | |
| JP | 6092641 B2 | 3/2017 | |
| JP | 6275114 B2 | 2/2018 | |
| KR | 20-2007-0000141 U | 1/2007 | |
| KR | 10-2010-0125836 A | 12/2010 | |
| KR | 10-2011-0050908 A | 5/2011 | |
| KR | 10-2013-0103452 A | 9/2013 | |
| KR | 10-1342492 B1 | 12/2013 | |
| KR | 10-2014-0008310 A | 1/2014 | |
| KR | 10-1388254 B1 | 5/2014 | |
| KR | 1391622 B1 | 5/2014 | |
| KR | 10-1468319 B1 | 12/2014 | |
| KR | 10-2015-0002735 A | 1/2015 | |
| KR | 10-2015-0035650 A | 4/2015 | |
| KR | 10-2015-0081441 A | 7/2015 | |

* cited by examiner

GEL NAIL STICKER AND MANUFACTURING METHOD THEREFOR

CROSS-REFERENCE TO RELATED APPLICATIONS

This application is a divisional of U.S. patent Ser. No. 15/579,005 filed on Dec. 1, 2017 which is a U.S. National Stage Application of International Application No. PCT/KR2016/008784, filed on Aug. 10, 2016, which claims the benefit under 35 USC 119(a) and 365(b) of Korean Patent Application No. 10-2015-0112544, filed on Aug. 10, 2015, in the Korean Intellectual Property Office.

TECHNICAL FIELD

The present invention relates to a gel nail sticker and a method of manufacturing the same, and more particularly, to a gel nail sticker, which is cured to a solid state when the gel nail sticker is attached onto a nail and then ultraviolet ray is irradiated to the gel nail sticker, and a method of manufacturing the same.

BACKGROUND ART

A beauty industry, which is one of the expression methods of human pursuing physical beauty, is accelerated in development and is simultaneously departmentalized. Particularly, after the 20th century, the beauty industry shows a remarkable market expansion and is popularized to the general public. In the beauty industry, a nail art is an essential element of expressing art on a human body regardless of ages and genders, and has been sharply developed.

Originally, the nail art is one field of the esthetic art and is one of the methods for beautifully decorating a body of a person, and a length, a shape, or a color of a nail is expressed while reflecting a change and a value of a culture of the times.

In the nail art in the related art, pigments, such as manicure of various colors, are mainly applied to a nail or a toenail. However, the method of applying a liquid pigment takes a long time for drying the pigment after the application of the pigment, and durability after the pigment is dried is considerably degraded, thereby causing inconvenience to a user.

Due to the problem, recently, an ultraviolet (UV) gel nail, in which a pigment includes a UV cure resin and is applied to a nail or a toenail, and then is forcibly cured by using a UV lamp, is getting on spotlight.

The UV gel is cured by an ultraviolet ray, and has various advantages in that the UV gel is flexible and soft, so that the UV gel is not easily broken, and even though the UV gel is exposed to the sun, the UV gel is not discolored, and the UV gel has excellent glossiness. Further, the UV gel is formed by applying a composition for forming a UV gel layer onto a natural nail and UV-curing the composition, and through the method, the natural nail becomes glossy and shiny to exhibit a luxurious effect, so that the UV gel is widely used.

However, despite the advantages, when the UV gel layer is directly formed on the natural nail in the related art, a process for immersing a finger to a harmful solvent for a long time in order to remove the UV gel layer is required, so that the process is very harmful to a skin and a nail and the natural nail is severely damaged after detaching the UV gel layer. Further, the UV gel layer in the related art has disadvantages in that a distal end at an opposite side of the cuticle is chipped or a portion of a distal end at the cuticle side is peeled.

As another type of nail art, a dry-type nail sticker has been developed in order to overcome the problems of the liquid product, such as a manicure or a UV Gel, but the dry-type nail sticker is a film mostly formed of the same raw material as that of the manicure, so that the dry-type nail sticker has very low durability after being attached, thereby degrading a maintenance property.

There is an artificial nail having excellent durability, but the artificial nail lacks flexibility and elasticity. Accordingly, a feeling of wearing and adhesiveness of the artificial nail is low and thus the artificial nail cannot be naturally seated on a nail, so that an esthetic impression is degraded and the entire artificial nail is detached from the nail.

DISCLOSURE

Technical Problem

The present invention has been made in an effort to solve the aforementioned problems, and an object of the present invention is as follows.

First, an object of the present invention is to provide a gel nail sticker, which enables a beginner to easily decorate a nail and a toenail within a short time with a simple process, and a method of manufacturing the same.

Second, an object of the present invention is to provide a gel nail sticker, which has improved durability, maintenance property, and adhesiveness, and a method of manufacturing the same.

Third, an object of the present invention is to provide a gel nail sticker, which is easily removed and minimizes damage to a skin and a nail, and a method of manufacturing the same.

Fourth, an object of the present invention is to provide a gel nail sticker, which makes deep glossiness unique to a gel nail, and a method of manufacturing the same.

Objects of the present invention are not limited to the objects described above, and other objects that are not described will be clearly understood by a person skilled in the art from the description below.

Technical Solution

In order to achieve the foregoing object, a gel nail sticker according to an exemplary embodiment of the present invention includes a lower laminated part and an upper laminated part.

The lower laminated part is a part directly attached to a nail or a toenail, and has a color or a pattern, and is formed of a flexible material so as to correspond to a curved surface of the nail or the toenail.

The upper laminated part is a transparent coated layer positioned on the lower laminated part and providing glossiness to a color or a pattern of the lower laminated part, and is in a flexible semi-solid state so as to correspond to the curved surface of the nail or the toenail before being attached to the nail or the toenail, and is cured to a solid state while maintaining a form attached to the nail or the toenail when an ultraviolet ray is irradiated to the upper laminated part after the upper laminated part is attached to the nail or the toenail.

The upper laminated part may include an ultraviolet curing raw material, a photo-initiator, and a heat dry raw material.

The ultraviolet curing raw material may be regularly maintained in a flexible semi-solid state, and receive energy from an external material and be cured to a polymer material in a solid state by photo-polymerization when ultraviolet rays are irradiated.

The photo-initiator may absorb energy from ultraviolet rays, and apply the energy to the ultraviolet curing raw material to make photo-polymerization start.

The heat dry raw material may be solidly dried by heat and contribute to filming after the drying, and prevent glossiness, prevent scratches, and give a cutting property.

The ultraviolet curing raw material and the heat dry raw material may be removable by a nail remover.

The upper laminated part may include an upper gel layer and a lower gel layer.

The upper gel layer may be a part exposed to the outside when being attached to the nail or the toenail, include the ultraviolet curing raw material, the heat dry raw material, and the photo-initiator, and further include an additive giving lubricity to a surface.

The lower gel layer may be a part which is positioned under the upper gel layer and is directly laminated with the lower laminated part, and include the heat dry raw material, the photo-initiator, and the ultraviolet curing raw material with a relatively larger ratio than a ratio of the ultraviolet curing raw material of the upper gel layer.

The lower gel layer may be more flexible than the upper gel layer before curing, but may have larger hardness than hardness of the upper gel layer after curing.

The upper gel layer may be less flexible than the lower gel layer before curing and decrease stickiness of a surface and blocks the lower gel layer from being in contact with oxygen to improve the degree of hardness of the lower gel layer when ultraviolet ray is irradiated.

The lower laminated part may include a color layer and an adhesive layer.

The color layer may include a pigment having a color and maintain flexibility regardless of irradiation of ultraviolet ray.

The adhesive layer may be a part directly attached to the nail or the toenail, be positioned under the color layer, and have adhesiveness.

The lower laminated part may further include a printed layer having various designs and printed on the color layer.

The upper laminated part may further include a protective film protecting the outermost surface, and the lower laminated part may further include a release paper preventing the lower laminated part from being contaminated by foreign substances before being attached to the nail or the toenail.

Herein, the protective film may include an ultraviolet blocking material and prevent the upper laminated part from being cured by ultraviolet ray included in natural light.

In order to achieve the foregoing objects, a method of manufacturing a gel nail sticker according to another exemplary embodiment of the present invention includes an upper laminated part forming operation, a lower laminated part forming operation, and a gel nail sticker forming operation.

The upper laminated part forming operation includes an upper gel layer forming process, a lower gel layer forming process, and a first laminating process.

In the upper gel layer forming process, an upper gel layer is formed by drying a composition, in which an ultraviolet curing raw material, a photo-initiator, a heat dry raw material, and an additive are mixed, for a predetermined time and making the composition be a film.

In the lower gel layer forming process, a lower gel layer is formed by drying a larger ratio of the ultraviolet curing raw material than a ratio of the ultraviolet curing raw material of the upper gel layer, the photo-initiator, and the heat dry raw material for a predetermined time and making the composition be a film.

In the first laminating process, the upper gel layer and the lower gel layer are laminated by applying a pressure to the upper gel layer and the lower gel layer at a high temperature.

The lower laminated part forming operation includes a process of forming a color layer by making a composition, in which a pigment having a color is mixed, be a film, and a second laminating process of winding an adhesive layer having adhesiveness together with the color layer with a predetermined tension and laminating the adhesive layer and the color layer.

Further, the gel nail sticker forming operation includes a third laminating process of forming the gel nail sticker by laminating the upper laminated part and the lower laminated part at a predetermined temperature.

The lower laminated part forming operation may further include a printed layer forming process of forming a printed layer by printing a pattern on the color layer.

The gel nail sticker forming operation may further include a cutting process of cutting the gel nail sticker into a shape of a nail or a toenail.

Advantageous Effects

The effect of the present invention formed as described above will be described below.

First, according to the gel nail sticker according to the exemplary embodiment of the present invention and the method of manufacturing the same, when the gel nail sticker is attached to a nail, the protective film is removed, and then ultraviolet ray is irradiated to the gel nail sticker for a predetermined time, the nail art is completed, so that a procedure of the nail art is very simple. Accordingly, it is possible to complete the nail art within a short time, thereby enabling a beginner to simply perform the nail art.

Secondly, according to the gel nail sticker according to the exemplary embodiment of the present invention and the method of manufacturing the same, the gel nail sticker is provided in a semi-solid state and corresponds to a curved surface of a nail or a toenail when being attached to a nail or a toenail, thereby having an excellent attachment property and having excellent durability after being cured to a solid state like a general gel nail.

Thirdly, according to the gel nail sticker according to the exemplary embodiment of the present invention and the method of manufacturing the same, the gel nail sticker includes the large quantity of ingredients removed by acetone, thereby being easily removed by a general nail polish remover including an acetone ingredient. Further, a nail or a toenail and a skin are exposed to a nail polish remover for a short time, thereby minimizing damage to the nail or the toenail and the skin.

Fourthly, according to the gel nail sticker according to the exemplary embodiment of the present invention and the method of manufacturing the same, the upper laminated part that is a transparent coated layer is formed with two gel layers, thereby implementing deep glossiness unique to a gel nail.

The effects of the present invention are not limited to the aforementioned effects, and other effects, which are not mentioned above, will be clearly understood by those skilled in the art from the claims.

DESCRIPTION OF DRAWINGS

Detailed descriptions of an exemplary embodiment of the present application described below and the foregoing summary may be more understood when the accompanying drawings are referred. The exemplary embodiments are illustrated in the drawings for the purpose of illustrating the present invention. However, it should be understood that the present application is not limited to accurate dispositions and means illustrated in the drawings.

BEST MODE

Hereinafter, a gel nail sticker according to an exemplary embodiment of the present disclosure will be described with reference to FIGS. 1 and 2.

Figure 1:
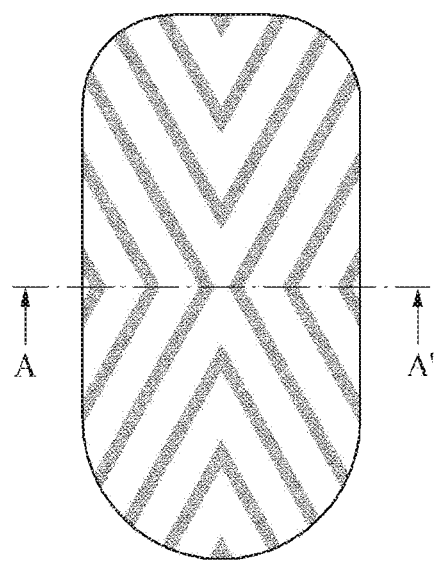
FIG. 1 is a top plan view illustrating a gel nail sticker according to an exemplary embodiment of the present invention.
Figure 2:
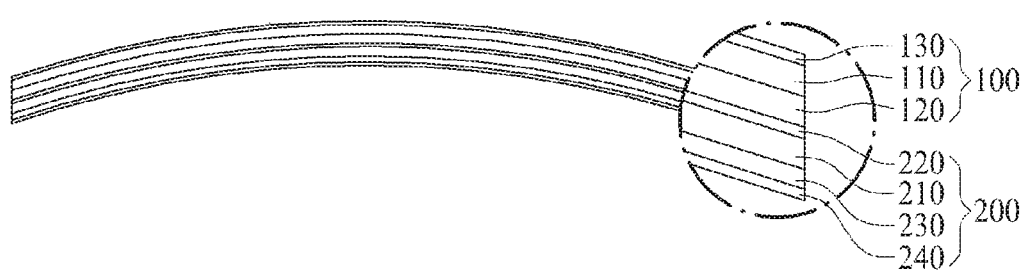
FIG. 2 is a cross-sectional view taken along the line A-A' of FIG. 1.

FIG. 1 is a top plan view illustrating a gel nail sticker according to an exemplary embodiment of the present invention, and FIG. 2 is a cross-sectional view taken along the line A-A' of FIG. 1.

As illustrated in FIGS. 1 and 2, a gel nail sticker according to an exemplary embodiment of the present invention is formed of a lower laminated part 200 and an upper laminated part 100.

The lower laminated part 200 is a part directly attached to a nail or a toenail, and has a color or a pattern, and is formed of a flexible material so as to correspond to a curved surface of a nail or a toenail.

The upper laminated part 100 is a transparent coating layer which is positioned on the lower laminated part 200 and gives glossiness to a color or a pattern of the lower laminated part 200, and the upper laminated part 100 is in a flexible semi-solid state so as to correspond to a curved surface of a nail or a toenail before being attached to the nail or the toenail, and when the upper laminated part 100 is attached to the nail or the toenail and then an ultraviolet ray is irradiated to the upper laminated part 100, the upper laminated part 100 is cured to a solid state while maintaining a form attached to the nail or the toenail.

That is, before an ultraviolet ray is irradiated to the gel nail sticker of the present exemplary embodiment, the entire gel nail sticker has a flexible property, so that the gel nail sticker may be closely attached to a nail while corresponding to a curved surface of the nail. Further, after the irradiation of ultraviolet ray, the lower laminated part 200 maintains the flexible property as it is to have a characteristic of a gel, but the upper laminated part 100 is cured to the solid state to give a solid property to the gel nail sticker, thereby preventing scratch and improving durability.

Further, the gel nail sticker of the present exemplary embodiment may be removed by a nail polish remover. Hereinafter, in the description of the present exemplary embodiment, a nail polish remover is acetone as an example, but the nail polish remover may also be an acetone-free remover which does not include acetone, and the gel nail sticker of the present exemplary embodiment may be removed by the acetone-free nail polish remover, like acetone.

More particularly, the upper laminated part 100 may include an upper gel layer 110 and a lower gel layer 120, and the lower laminated part 200 may include a printed layer 220, a color layer 210, and an adhesive layer 230. That is, the gel nail sticker the present exemplary embodiment may be formed by sequentially laminating the upper gel layer 110, the lower gel layer 120, the printed layer 220, the color layer 210, and the adhesive layer 230.

First, the upper gel layer 110 is a part which is positioned at the uppermost end of the gel nail sticker of the present exemplary embodiment and is exposed to the outside when the gel nail sticker is attached to a nail or a toenail. The upper gel layer 110 may include a heat dry raw material, the small quantity of ultraviolet curing raw material, a photo-initiator, and an additive. That is, the upper gel layer 110 may be in a state, in which the heat dry raw material, the ultraviolet curing raw material, the photo-initiator, and the additive are dissolved in a solvent.

Herein, the heat dry raw material may be a material which is solidly dried by heat to contribute to filming of the upper gel layer 110 after the drying, and provides glossiness, prevents scratches, and gives a cutting property. In the heat dry raw material, the plurality of ingredients is mixed to exhibit the foregoing characteristics.

Further, the ultraviolet curing raw material may be a material which is regularly maintained in a flexible semi-solid state, and receives energy from an external material and is cured to a polymer material in a solid state by photo-polymerization when ultraviolet ray is irradiated.

The ultraviolet curing raw material may exist in a liquid state at a room temperature before curing and be dissolved in a solvent, and may be dissolved in the solvent together with the heat dry raw material and then dried.

After the drying, the heat dry raw material forms a film layer in a solid state and the ultraviolet curing raw material is left in the liquid state, thereby giving flexibility to the film layer. That is, microscopically, the ultraviolet curing raw material in the liquid state may exist between the heat dry raw materials in the solid state.

In the present exemplary embodiment, the ultraviolet curing raw material included in the upper gel layer 110 may include a urethane acrylate oligomer and a polyester oligomer.

Herein, the urethane acrylate oligomer is an ultraviolet reactive resin, and contributes to the flexible property of the upper gel layer 110 before the gel nail sticker is cured and has a flexible property after the curing. Further, the urethane acrylate oligomer is not dissolved in acetone after the curing, but has a swelling property, thereby improving removability of the gel nail sticker by the acetone.

Further, the polyester oligomer is also an ultraviolet reactive resin, and contributes to the flexible property before the gel nail sticker is cured and has a rigid property after the curing. Accordingly, the polyester oligomer may contribute to the improvement of rigidity after the gel nail sticker is cured. Further, after the polyester oligomer is cured, the polyester oligomer is not dissolved in acetone, and is not swelled well, so that removability by acetone is degraded.

As described above, it is possible to adjust a desired degree of rigidity after the curing by appropriately mixing the two ingredients having the different properties, and removability by acetone may also be appropriately maintained.

The upper gel layer 110 includes the small quantity of ultraviolet curing raw material to have a small degree of curing, and is positioned on the lower gel layer 120 including the large quantity of ultraviolet curing raw material, thereby decreasing surface stickiness that is a characteristic of a semi-cured film.

When the ultraviolet curing raw material is in contact with oxygen, the degree of hardness is sharply degraded, so that the protective film 130 protecting the upper gel layer 110 may be provided on a surface of the upper gel layer 110. The protective film 130 may include an ultraviolet blocking material in order to prevent the ultraviolet curing raw material included in the upper gel layer 110 from being cured by an ultraviolet ray included in natural light.

Further, the photo-initiator is a material which absorbs energy from an ultraviolet ray and applies the energy to the ultraviolet curing raw material to make the ultraviolet curing raw material start photo-polymerization, and in the present exemplary embodiment, the photo-initiator may include trimethylbenzoyl phosphneoxide.

Further, the additive may include a leveling agent giving lubricity to a coated surface and giving a defoamation restricting property, and an antifoaming agent giving a defoamation property.

Further, in the present exemplary embodiment, propyl acetate may be applied as a solvent, in which the heat dry raw material, the ultraviolet curing raw material, and the photo-initiator are dissolved. The propyl acetate is the safest organic solvent having the lowest harmfulness to a human body, and the propyl acetate is volatilized after being dried, so that the quantity of propyl acetate left may be less than 1%.

In the present exemplary embodiment, the upper gel layer 110 may be formed to have a thickness of 65 μm.

The lower gel layer 120 is a part which is positioned under the upper gel layer 110 and is directly laminated with the lower laminated part 200, and may include the heat dry raw material, the ultraviolet curing raw material, and the photo-initiator.

Herein, the heat dry raw material, the ultraviolet curing raw material, and the photo-initiator are dissolved in the solvent, and the heat dry raw material, the ultraviolet curing raw material, the photo-initiator, and the solvent of the lower gel layer 120 may be formed of the same ingredients as those of the upper gel layer 110. However, unlike the upper gel layer 110 including the small quantity of ultraviolet curing raw material, the lower gel layer 120 may include the larger ratio of ultraviolet curing raw material than that of the upper gel layer 110.

Accordingly, the lower gel layer 120 has a very flexible property before being cured, and has surface stickiness, so that the lower gel layer 120 may be more easily attached to the lower laminated part 200 when being laminated with the lower laminated part 200. Further, the lower gel layer 112 including the large quantity of ultraviolet curing raw material has the very high degree of hardness after being cured to considerably contribute to a solid property of the gel nail sticker.

The degree of hardness of the lower gel layer 120 including the large quantity of ultraviolet curing raw material may be sharply degraded when the lower gel layer 120 is in contact with oxygen, and the lower gel layer 120 is coated by the upper gel layer 110 including the small quantity of ultraviolet curing raw material, thereby being blocked from being in contact with oxygen. Accordingly, the degree of hardness of the lower gel layer 120 may be improved.

In the present exemplary embodiment, the lower gel layer 120 may be formed to have a thickness of 65 μm.

In the meantime, the color layer 210 may be in a state in which a pigment having a color, an ultraviolet curing raw material, and a heat dry raw material are dissolved in the solvent. That is, the color layer 210 is a part by which a color of the gel nail sticker is determined.

In the present exemplary embodiment, the ultraviolet curing raw material of the color layer 210 includes a polyester oligomer to contribute to a flexible property of the gel nail sticker. The polyester oligomer is the same as that included in the upper gel layer 110.

Further, the heat dry raw material and the solvent included in the color layer 210 have the same ingredients as those of the heat dry raw material and the solvent of the upper gel layer 110, so that the descriptions thereof will be omitted.

However, the color layer 210 includes the ultraviolet curing raw material, but does not include a photo-initiator, so that the color layer 210 is not cured by an ultraviolet ray. Accordingly, the color layer 210 most considerably contributes to a flexible property of the gel nail sticker after the ultraviolet ray is irradiated, and the non-cured ultraviolet curing raw material has a sticky property, so that the color layer 210 may be a base material giving adhesiveness to the printed layer 220 which is to be described below.

In the present exemplary embodiment, the color layer 210 may be formed to have a thickness of 50 μm.

The printed layer 220 is a part expressing various designs and patterns of the gel nail sticker of the present exemplary embodiment, and may be selectively printed on the color layer 210. That is, the nail sticker having only a color is not provided with the printed layer 220, and the nail sticker having both a color and a pattern may be provided with the printed layer 220.

The printed layer 220 may be formed by all kinds of printing methods, such as silk screen printing, digital printing, gravure printing, stamping printing, glitter printing, and vacuum deposition.

As long as a material does not damage the property of the color layer 210, any kind of material may be applied to the printed layer 220, and the printed layer 220 does not include the ultraviolet curing raw material and the photo-initiator, so that the printed layer 220 is not cured by an ultraviolet ray.

In the present exemplary embodiment, the printed layer 220 may be formed to have a thickness of 5 to 55 μm.

The adhesive layer 230 is a part directly attached to a nail or a toenail, and may be positioned under the color layer 210 and may be formed of an adhesive material.

Herein, the adhesive layer 230 does not include an ultraviolet curing raw material and a photo-initiator, so that when the ultraviolet ray is irradiated to the adhesive layer 230, the adhesive layer 230 is not cured.

In the present exemplary embodiment, the adhesive layer 230 may be formed to have a thickness of 30 μm.

A release paper 240 for preventing the adhesive layer 230 from being contaminated by foreign substances may be provided under the adhesive layer 230.

In the above, the configuration of the gel nail sticker according to the exemplary embodiment of the present invention has been described. The ingredient, the thickness, and the like of each layer are simply one exemplary embodiment, and the ingredient, the thickness, and the like of each layer are not limited to the foregoing ingredient and thickness, and the like, and as long as an ingredient exhibits the characteristic of each layer, any kind of ingredient is applicable, and a thickness thereof will also be adjusted.

Figure 3:
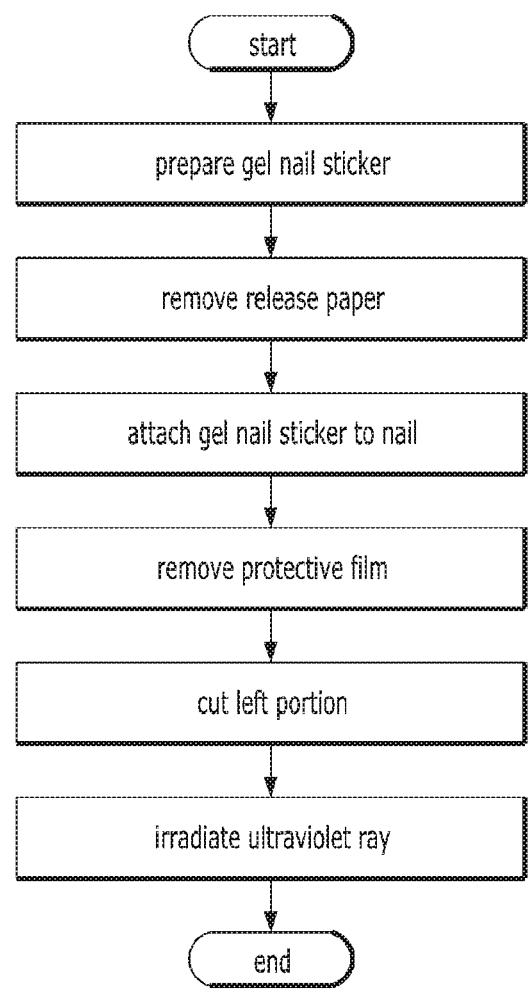
FIG. 3 is a flowchart illustrating a process of performing a nail art by using the gel nail sticker according to an exemplary embodiment of the present invention.

FIG. 3 is a flowchart illustrating a process of performing a nail art by using the gel nail sticker according to an exemplary embodiment of the present invention.

According to the gel nail sticker according to the exemplary embodiment of the present invention formed as described above, as illustrated in FIG. 3, first, the gel nail sticker of the present exemplary embodiment is prepared, the release paper 240 is removed and the gel nail sticker is attached to a nail or a toenail, and the protective film 130 at an upper side is removed and a portion of the gel nail sticker deviating from the nail or the toenail may be cut by using the nail. Then, when the ultraviolet ray is irradiated to the gel nail sticker attached to the nail or the toenail for a predetermined time, the upper laminated part 10 is solidly cured to complete a nail art.

Accordingly, the gel nail sticker maintains durability and esthetic impression that are the advantages of the gel nail in the related art and considerably decreases a time taken for completing a nail art, and a procedure of a nail art using the gel nail sticker is very simple, so that a beginner may easily perform a nail art by himself/herself. Further, a user may perform a nail art by himself/herself without visiting a nail shop, thereby decreasing time and costs.

Further, the gel nail sticker is removable by acetone which is an ingredient of a general nail polish remover, thereby minimizing damage to a nail, a toenail, and a skin around thereof.

In the above, the configuration and the effect of the gel nail sticker of the present exemplary embodiment have been described.

Hereinafter, a method of manufacturing the gel nail sticker according to an exemplary embodiment of the present invention will be described with reference to FIG. 4.

Figure 4:
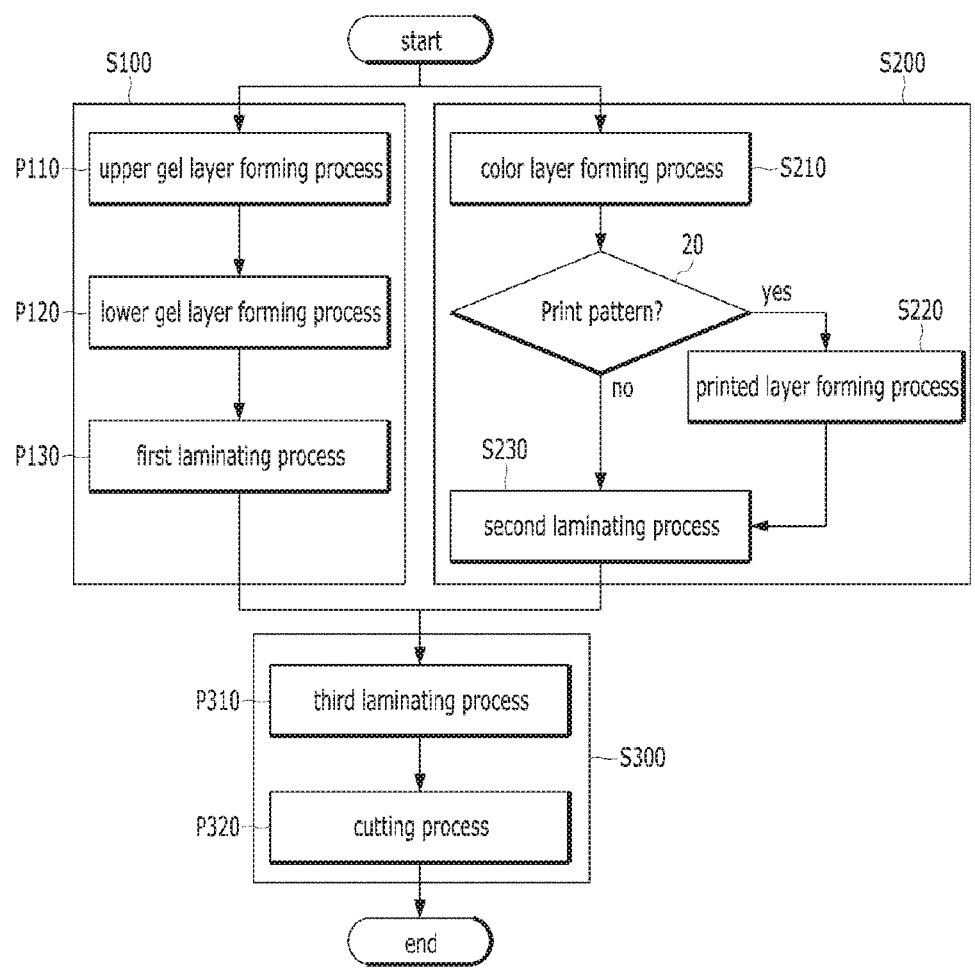
FIG. 4 is a flowchart illustrating a method of manufacturing the gel nail sticker according to an exemplary embodiment of the present invention.

FIG. 4 is a flowchart illustrating a method of manufacturing a gel nail sticker according to an exemplary embodiment of the present invention.

As illustrated in FIG. 4, a method of manufacturing a gel nail sticker according to an exemplary embodiment of the present invention includes an operation S100 of forming an upper laminated part, an operation S200 of forming a lower laminated part, and an operation S300 of forming a gel nail sticker.

The operation S100 of forming the upper laminated part includes an upper gel layer forming process P110, a lower gel layer forming process P120, and a first laminating process P130.

In the upper gel layer forming process P110, the upper gel layer is formed by drying an ultraviolet curing raw material, a photo-initiator, a heat dry raw material, and an additive dissolved in a solvent under a predetermined temperature and time condition and making the ultraviolet curing raw material, the photo-initiator, the heat dry raw material, and the additive be a film. Further, in the upper gel layer forming process P110, an upper gel layer roll may be formed by winding the filmed upper gel layer.

In the lower gel layer forming process P120, the lower gel layer is formed by drying the larger ratio of ultraviolet curing raw material than that of the upper gel layer dissolved in the solvent, the photo-initiator, and the heat dry raw material under a predetermined temperature and time condition and making the ultraviolet curing raw material, the photo-initiator, and the heat dry raw material be a film.

Further, in the first laminating process P130, the upper gel layer and the lower gel layer are laminated by applying a pressure under a predetermined temperature condition to form the upper laminated part.

For example, in the first laminating process P130, the lower gel layer formed in the lower gel layer forming operation is wound around the upper laminated part roll, and in this case, a distal end of the upper gel layer wound around the upper gel layer roll may be connected to the upper laminated part roll together with the lower gel layer to be wound. Accordingly, the upper gel layer roll rotates in an opposite direction, and the wound upper gel layer is unwound and is wound around the upper laminated part roll together with the lower gel layer, so that the upper gel layer may be laminated on the lower gel layer.

The lower laminated part forming process S200 includes a color layer forming process P210 and a second laminating process P230.

In the color layer forming process P120, a color layer serving as a background color of the gel nail sticker is formed by making a composition be a film, in which the ultraviolet curing raw material, the heat dry raw material, and a pigment having a color are mixed.

After the color layer is formed in the color layer forming process P210, a printed layer forming process P220 for forming a printed layer by printing a pattern on an upper end of the color layer may be further performed. The printed layer forming process P220 is a process performed only when the gel nail sticker formed with a pattern is manufactured, a printed layer forming process P220 may be omitted when the gel nail sticker having only a color without a pattern is manufactured.

In the second laminating process P230, an adhesive layer having adhesiveness is wound with the color layer with predetermined tension to laminate the adhesive layer and the color layer.

The gel nail sticker forming operation S300 includes a third laminating process P310.

In the third laminating process P310, the upper laminated part and the lower laminated part are laminated at a predetermined temperature to form the gel nail sticker.

Further, the gel nail sticker forming operation S300 may further include a cutting process P320 of cutting the gel nail sticker in a shape of a nail or a toenail. The cutting process P320 may be omitted when the gel nail sticker manufactured through the third laminating process P310 corresponds to a shape of the nail or the toenail.

Herein, the respective processes and operations of the method of manufacturing the gel nail sticker are not limited to the sequence exemplified above, and as long as the gel nail sticker is formed, the gel nail sticker may be manufactured in any sequence.

The exemplary embodiments according to the present invention have been described above, and it is obvious to those skilled in the art that in addition to the aforementioned exemplary embodiments, the present invention may be implemented as other specific forms without departing from the purpose and the scope of the present invention. Accordingly, the aforementioned exemplary embodiments should be only illustrative and not restrictive for this invention, and thus, the present invention is not limited to the aforementioned description, but may be modified within the scope of the appended claims and equivalents thereto.

The invention claimed is:

1. A method of manufacturing a gel nail sticker, the method comprising:
   forming an upper laminated part comprising:
      forming an upper gel layer by drying a first composition comprising a mixture of an ultraviolet curing raw material, a photo-initiator, a heat dry raw material, and an additive, for a predetermined time and making the composition be a film;
      forming a lower gel layer by drying a second composition comprising a greater amount of the ultraviolet curing raw material than an amount of the ultraviolet curing raw material of the first composition, the photo-initiator, and the heat dry raw material for a predetermined time and making the composition be a film; and first laminating process comprising laminating the upper gel layer and the lower gel layer by applying heat and pressure to the upper gel layer and lower gel layer;

forming a lower laminated part comprising:
- forming a color layer by making a composition comprising a mixture of a pigment having a color into a film; and
- a second laminating process comprising: winding an adhesive layer together with the color layer with a predetermined tension; and laminating the wound adhesive layer together with the color layer;

forming a gel nail sticker comprising a third laminating process comprising laminating the upper laminated part and the lower laminated part at a predetermined temperature; and disposing a protective film protecting outermost surface of the gel nail sticker on the upper laminated part.

2. The method of claim 1, wherein the forming the lower laminated part further comprises disposing a printed layer by printing a pattern on the color layer.

3. The method of claim 1, wherein the forming the gel nail sticker further comprises cutting the gel nail sticker into a shape of a nail or a toenail.

4. The method of claim 1, wherein, prior to an irradiation by a ultraviolet ray, the gel nail sticker maintains flexibility.

5. The method of claim 1, wherein after an irradiation by a ultraviolet ray, the lower laminated part maintains flexibility, but the upper laminated part cures into solid state.

6. The method of claim 1, wherein the ultraviolet curing raw material and the heat dry raw material are removable by a nail polish remover.

7. The method of claim 1, wherein the upper gel layer is less flexible than the lower gel layer, decreases stickiness of a surface of the gel nail sticker, and blocks the lower gel layer from being in contact with an oxygen to improve a degree of hardness of the lower gel layer after an irradiation by a ultraviolet ray.

8. The method of claim 1, wherein the lower gel layer is more flexible than the upper gel layer prior to an irradiation by a ultraviolet ray, and a degree of hardness of the lower gel layer is greater than a degree of hardness of the upper gel layer after the irradiation by the ultraviolet ray.

9. The method of claim 1, wherein the ultraviolet curing raw material is a mixture of a urethane acrylate oligomer and a polyester oligomer.

10. The method of claim 9, wherein, after the irradiation by the ultraviolet ray, the urethane acrylate oligomer maintains flexibility.

11. The method of claim 9, wherein, after the irradiation by the ultraviolet ray, the polyester oligomer cures into solid state.

12. The method of claim 9, wherein, after an irradiation by a ultraviolet ray, a removability of the urethane acrylate oligomer by a nail polish remover is increased.

13. The method of claim 9, wherein, after an irradiation by a ultraviolet ray, a removability of the polyester oligomer by a nail polish remover is decreased.

14. The method of claim 1, further comprising disposing a release paper preventing the lower laminated part from being contaminated by foreign substances before being attached to the nail or the toenail on the lower laminated part.

15. The method of claim 1, wherein the protective film comprises an ultraviolet blocking material and prevents the upper laminated part from being cured by ultraviolet ray of a natural light.

16. The method of claim 1, wherein the lower laminated part is directly attached to a nail or a toenail, has a color or a pattern, and formed of a flexible material corresponding to a curved surface of the nail or the toenail.

17. The method of claim 1, wherein the adhesive layer is directly attached to a nail or a toenail and disposed under the color layer.

18. A method of manufacturing a gel nail sticker, the method comprising:

forming an upper laminated part comprising:
- forming an upper gel layer by drying a first composition comprising a mixture of an ultraviolet curing raw material, a photo-initiator, a heat dry raw material, and an additive, for a predetermined time and making the composition be a film;
- forming a lower gel layer by drying a second composition comprising a greater amount of the ultraviolet curing raw material than an amount of the ultraviolet curing raw material of the first composition, the photo-initiator, and the heat dry raw material for a predetermined time and making the composition be a film; and
- first laminating process comprising laminating the upper gel layer and the lower gel layer by applying heat and pressure to the upper gel layer and lower gel layer;

forming a lower laminated part comprising:
- forming a color layer by making a composition comprising a mixture of a pigment having a color into a film; and
- a second laminating process comprising: winding an adhesive layer together with the color layer with a predetermined tension; and laminating the adhesive layer and the color layer;

forming a gel nail sticker comprising a third laminating process comprising laminating the upper laminated part and the lower laminated part at a predetermined temperature; and disposing a release paper preventing the lower laminated part from being contaminated by foreign substances before being attached to the nail or the toenail on the lower laminated part.

* * * * *